United States Patent
Bera et al.

(10) Patent No.: US 9,965,252 B2
(45) Date of Patent: May 8, 2018

(54) METHOD AND SYSTEM FOR GENERATING STATEFLOW MODELS FROM SOFTWARE REQUIREMENTS

(71) Applicant: Infosys Limited, Bangalore (IN)

(72) Inventors: Padmalochan Bera, Bangalore (IN); Anjaneyulu Pasala, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days. days.

(21) Appl. No.: 14/614,278

(22) Filed: Feb. 4, 2015

(65) Prior Publication Data

US 2015/0261505 A1   Sep. 17, 2015

(30) Foreign Application Priority Data

Mar. 13, 2014  (IN) .................... 1330/CHE/2014

(51) Int. Cl.
*G06F 8/20*     (2018.01)
*G06F 9/44*     (2018.01)

(52) U.S. Cl.
CPC .................. *G06F 8/10* (2013.01); *G06F 8/20* (2013.01); *G06F 9/444* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 7,895,025 B2 | 2/2011 | Boutin | |
| 8,271,943 B2 | 9/2012 | Hudson | |
| 8,280,713 B2 | 10/2012 | Adir et al. | |
| 2004/0123272 A1* | 6/2004 | Bailey | G06F 11/3696 717/125 |
| 2004/0210873 A1 | 10/2004 | Tudor | |
| 2007/0266366 A1* | 11/2007 | Bucuvalas | 717/104 |
| 2008/0092109 A1* | 4/2008 | Kinnucan, Jr. | G06F 8/10 717/105 |
| 2008/0243767 A1* | 10/2008 | Naibo | G06F 17/30917 |
| 2014/0165043 A1* | 6/2014 | Pasala et al. | 717/124 |

FOREIGN PATENT DOCUMENTS

| | | |
|---|---|---|
| CA | 2 397 372 | 7/2001 |
| EP | 1259831 | 11/2002 |
| WO | WO 01/53841 A1 | 7/2001 |

OTHER PUBLICATIONS

Lee et al., Modeling software requirement with timing diagram and Simulink Stateflow, 2010 (Year: 2010).*

(Continued)

*Primary Examiner* — Timothy A Mudrick
*Assistant Examiner* — Zhan Chen
(74) *Attorney, Agent, or Firm* — Klarquist Sparkman, LLP (57) ABSTRACT

Described are a method and system for generating stateflow model from software requirements. The method includes receiving at least one software requirement as input. The method also includes annotating the received software requirements to create annotated software requirements. The method further includes parsing the annotated software requirements to create a plurality of stateflow blocks. The method further includes connecting, the created stateflow blocks, to generate a stateflow model.

18 Claims, 3 Drawing Sheets

(56) References Cited

OTHER PUBLICATIONS

Singh et al., Stateflow to Tabular Expressions, 2015 (Year: 2015).*
Gadkari et al., "AutoMOTGen: Automatic Model Oriented Test Generator for Embedded Control Systems," Computer Aided Verification, Lecture Notes in Computer Science, vol. 5123, 2008, pp. 204-208.
Gadkari et al, "AutoMOTGen: Automatic Model Oriented Test Generator for Embedded Control Systems," Computer Aided Verification, Lecture Notes in Computer Science, vol. 5123, 2008, pp. 204-208 (6-page abstract only), http://link.springer.com/chapter/10.1007/978-3-540-70545-1_19#.
Apfelbaum et al., "Model Based Testing," retrieved from http://citeseerx.ist.psu.edu/viewdoc/summary?doi=10.1.1.86.1342 (1997), 14 pages.

* cited by examiner

FIG. 2

FIG. 3

METHOD AND SYSTEM FOR GENERATING STATEFLOW MODELS FROM SOFTWARE REQUIREMENTS

CROSS REFERENCE TO RELATED APPLICATIONS

This application claims the benefit of Patent Application No. 1330/CHE/2014, filed in India on Mar. 13, 2014.

FIELD

The field generally relates to software engineering, and more particularly, to a method and system for generating stateflow models from software requirements.

BACKGROUND

Generally, due to increasing complexity and heterogeneity of software, it requires significant emphasis on evolving further requirements based software testing. Existing techniques in the area of requirement based software testing focuses on formalizing the software requirements as linear temporal logic properties and then generating test cases from the requirement model (herein after referred as stateflow model) that satisfy a coverage goal over the linear temporal logic properties. However, the current practice in industries is the manual extraction of stateflow model and properties from the software requirements.

The manual extraction of stateflow model from the software requirements has significant limitations. Firstly, this process incurs additional overhead both in terms of cost and time in generating the stateflow models from the requirements and thereby delays the overall software test case generation process. This in turn significantly impact on the software and product development and delivery process of the organization. Secondly, the manually generated software model may be error-prone or may not represent some functionality, as a result the model might not be able to uncover some critical bugs (such as, missing condition, variable, reference, operator negation, calibration mismatch, etc.) in the software when it is used to generate test cases. Moreover, even if there is any bug detected in the software it might be impossible to map the bug to the requirement. Therefore, there is a need to automatically generate executable stateflow models from the software requirements which will in turn facilitate timely generation of adequate and optimal test cases Hence, there is a need of a method and system for generating stateflow models from software requirements to address the aforementioned issues.

SUMMARY

An object of the invention is to provide a method and system for generating stateflow models from software requirements. This provides an automated technique to the engineering community for deriving formal stateflow model from the software requirements which will facilitate in generating adequate and quality test cases for validating the software or guidelines for changes in the requirements.

As described herein, a variety of other features and advantages can be into the technologies as desired.

The foregoing and other features and advantages will become more apparent to one skilled in the art from the following detailed description of disclosed embodiments, which proceeds with reference to the accompanying drawings.

BRIEF DESCRIPTION OF DRAWINGS

The accompanying drawings, which constitute a part of this disclosure, illustrate various embodiments and aspects of present invention and together with the description, explain the principle of the invention.

DETAILED DESCRIPTION

EXAMPLE 1

Exemplary Overview

The technologies described herein can be used for automated generation of stateflow models from software requirements. Adoption of the technologies can provide an efficient technique for reducing test effort and associated cost required in software development.

The technologies are targeted to significantly save the effort (both in terms of cost and time) of generating test cases from the software requirements. It will also increase the scope of detecting more potential bugs in the software. This could provide the development team more time to fix the reported bugs due to decrease in time taken for manual bug detection and reporting. And, clients greatly benefit from the technologies because they enjoy accurate and credible delivery of services to their specific business needs and reach market faster as it reduces testing effort.

EXAMPLE 2

Exemplary Method for Generating Stateflow Models from Software Requirements

Figure 1:
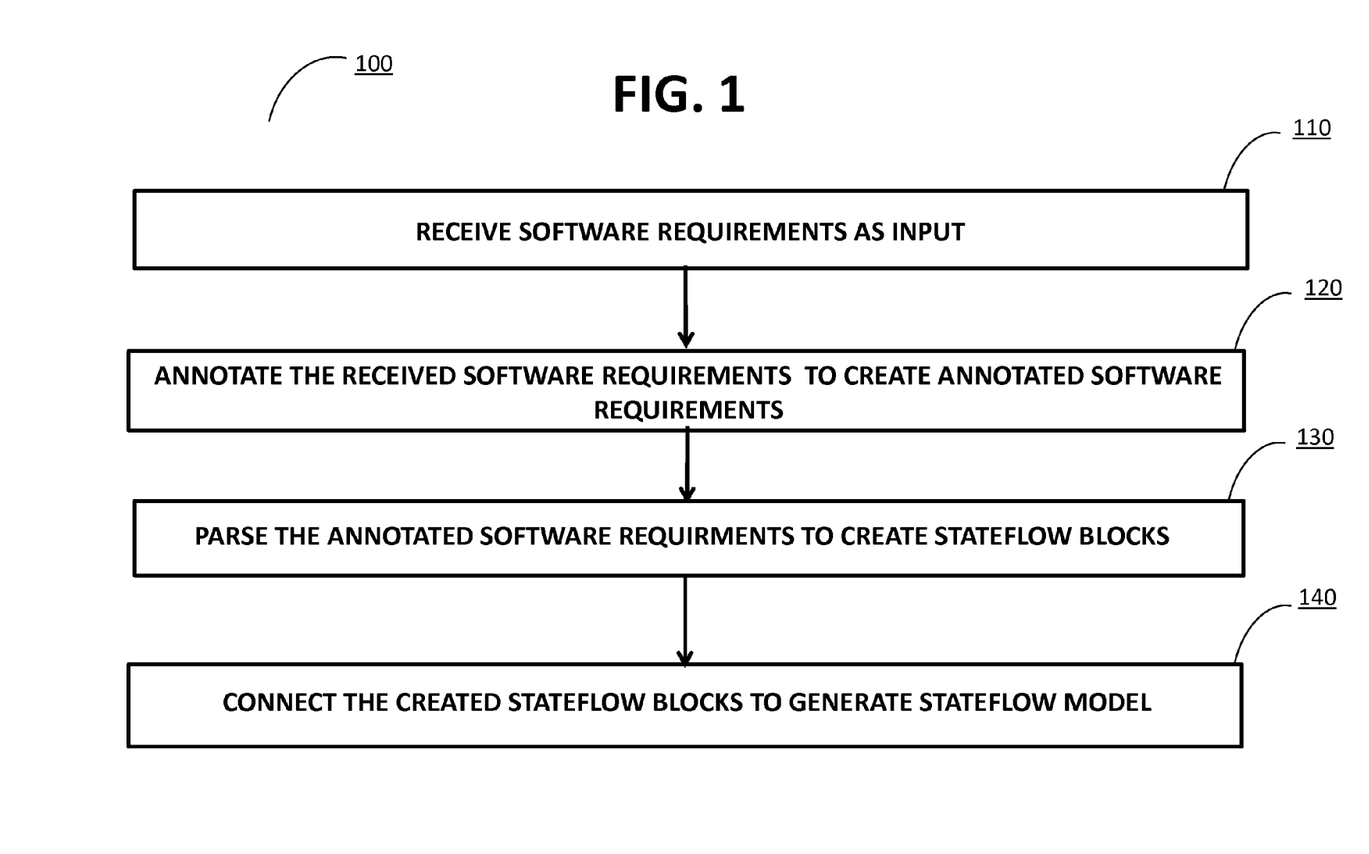
FIG. 1 is a flowchart representing steps involved in an exemplary method for generating stateflow models from software requirements described herein.
Figure 2:
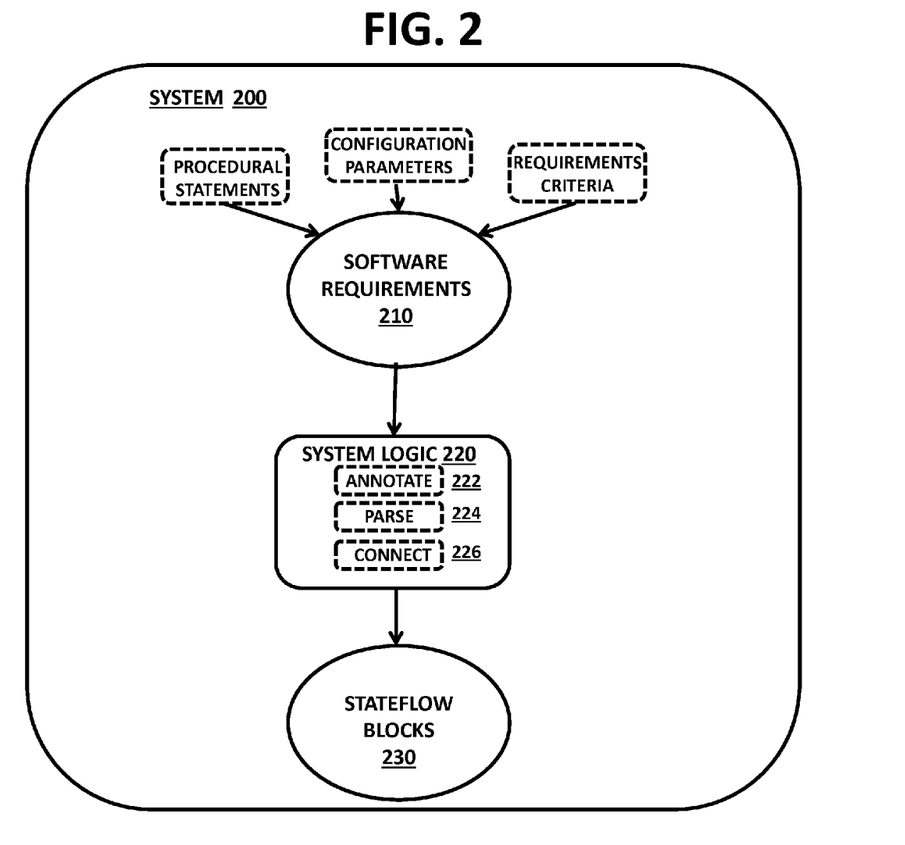
FIG. 2 is a diagrammatic representation of an exemplary system for generating stateflow models from software requirements described herein.

FIG. 1 is a flowchart of an exemplary method 100 of implementing the generation of stateflow models from software requirements described herein and can be implemented for example in a system such as shown in FIG. 2. The technologies described herein can be generic to the specifics of operating systems or hardware and can be applied in any variety of environments to take advantage of the described features.

At 110, software requirements for a new software to be developed are received as input. The software requirements may include procedural statement, configuration parameters and requirement criteria such as functional coverage. Such requirements can be provided by a user or another software tool.

At 120, the received software requirements are annotated to create annotated software requirements. The step of annotating may include labelling each of the procedural statement received as software requirements. The step of annotating may further include storing the labelled procedural statement with the definition and scope of the configuration parameters as parameter definition file to create annotated software requirements.

At 130, the annotated software requirements are parsed to generate a plurality of stateflow blocks. The step of parsing may include creating a plurality of stateflow blocks for the operators of the labeled procedural statement from the parameter definition file. The step of parsing may further include mapping the definition and scope of the configuration parameters from the parameter definition file to the created stateflow blocks.

At 140, the created stateflow blocks are connected to generate a stateflow model. The step of connecting may include identifying, for each pair of stateflow blocks the common parameter with scope. The step of connecting may further include interconnecting, the software blocks, based on the identified common parameter to generate the stateflow model till no further interconnection is possible.

The method 100 may also include validating the generated stateflow model by simulation run of test data. The method 100 may further include displaying the generated stateflow model.

The method 100 and any of the methods described herein can be performed by computer-executable instructions stored in one or more computer-readable media (storage or other tangible media) or stored in one or more compute readable storage devices.

EXAMPLE 3

Exemplary System for Generating Stateflow Models from Software Requirements

FIG. 2 is a block diagram of an exemplary system 200 implementing the generation of stateflow model from software requirements described herein. In the example, one or more computers in a computing environment implement system 200 that accepts as input software requirements 210. The system 200 includes system logic 220, which processes software requirements 210 to provide stateflow model 230. The input software requirements 210 may include procedural statement, configuration parameters and requirement criteria such as functional coverage. Such requirements can be provided by a user or another software tool. The system logic 220 annotates 222 the received software requirements to create annotated software requirements. The annotating 222 by system logic 220 may include labelling each of the procedural statement received as software requirements. The annotating 222 by system logic 220 may also include storing the labelled procedural statement with the definition and scope of the configuration parameters as parameter definition file to create annotated software requirements. The system logic 220 also parse 224 the annotated software requirements to create a plurality of stateflow blocks. The parsing 224 may include creating a plurality of stateflow blocks for the operators of the labeled procedural statement from the parameter definition file. The parsing 224 may further include mapping the definition and scope of the configuration parameters from the parameter definition file to the created stateflow blocks. The system logic 220 further connect 226 the created stateflow blocks to generate stateflow models. The connecting 226 may include identifying, for each pair of stateflow blocks the common parameter with scope. The connecting 226 may also include interconnecting, the software blocks, based on the identified common parameter to generate the stateflow model 230 till no further interconnection is possible.

The system 200 may also include capabilities for validating the generated stateflow model by simulation run of test data. The system 200 may further include displaying the generated stateflow model. The visualization can be either reports or dashboards based on the user requirements.

In practice, the systems shown herein, such as system 200 can be more complicated, with additional functionality, more complex inputs, and the like.

In any of the examples herein, the inputs, outputs and generated stateflow model 230 can be stored in one or more computer-readable storage media.

EXAMPLE 4

Exemplary Software Requirements

In any of the examples herein, software requirements may be a condition or capability needed by a user to solve a problem or achieve an objective. It may also be defined as a condition or capability that must be met or possessed by a system or system component to satisfy a contract, standard, specification, or other formally imposed document. The software requirements may further be defined as a documented representation of a condition or capability as mentioned above.

The software requirements are typically maintained as Software requirement specification (SRS) in a documented form. A requirements specification for a software system, is a complete description of the behavior of a system to be developed and may include a set of use cases that describe interactions the users will have with the software. In addition it also contains non-functional requirements. Non-functional requirements impose constraints on the design or implementation (such as performance engineering requirements, quality standards, security concerns or design constraints).

The software requirements specification is written in natural English language. There are different styles of writing the SRS documents such as, procedural requirements, functions, scenarios, etc. More than 90% of the requirements in control software specification are procedural in nature. Such specifications contain two types of definitions: (i) Configuration parameters; and (ii) procedural statements. The configuration parameters are of four classes: (i-a) primary inputs or signals; (i-b) intermediate or state variables; (i-c) outputs; and (i-d) calibration parameters. A configuration parameter includes name, data type, and value range. Normally, the data type and value range associated to the input parameters are defined in a separate data file called signal data base file. Intermediate variables are defined in the requirement which consists of variable name, data type and variable state. On the other hand, calibration parameters are environment variables which can be configured within a specific range of values under different scenarios. The calibrations are separately listed in the configuration parameter database in a tabular form which contains calibration name, value range, offset and description. Constants hold fixed value throughout the specification. A procedural statement typically consists of a condition and a decision component. The condition components are functionally defined over the input parameters, state variables, calibration sets and constants with a set of logical operators. However, the decisions are defined over the output parameters, state variables and calibration sets with arithmetic operators. A procedural statement of instrument panel cluster unit (IPCU) from automotive vehicle has been presented below as follows:

```
if Power mode is RUN
   if Signal has been received exactly one time during current
   ignition cycle then
      Fuel_Level_Percent = FLP_n
   else if Signal been received at least two times during
   current ignition cycle then
      Fuel_Level_Percent (Y) = k × FLP_n + (1 − k) × FLP(Y)_{n−1}
   else
      Fuel_Level_Percent = 0
   end if
end if
   FLP_{n−1} = FLP_n
```

It specifies the procedure for calculating the Fuel_Level_Percent based on current and previous values of the signal, FLP which is received from the corresponding bus signal of the IPC hardware. The FLP signal is essentially a vector consisting of signal status and value. The triggering condition for the calculation is dependent on power mode and the number of times the FLP signal has been received (i.e., status bit becomes active). The calculation also involves the calibration, fuel_level_percent_filter (k) whose range and type is defined in the parameter database file. The value of Fuel_Level_Percent is used for calculating the total fuel range as per the requirement. Example of parameter list for the procedural requirement is shown in Table 1.

TABLE 1

Example of Configuration Parameter List with Description

| Parameter Name | Parameter Type | Data Type | Values/Value Range | | | |
|---|---|---|---|---|---|---|
| | | | normal | min | max | offset |
| Power Mode | Input | Enumerated | Idle, Active, Crank, RUN | — | — | — |
| FLP | Input | Vector <status-bit, value> (Boolean, Float) | — | — | — | — |
| status-bit | | | 1/0 | — | — | — |
| value | | | — | 0 | 100 | — |
| Fuel_percent_filter(k) | Calibration | Float | 0.5 | 0.5 | 0.9 | 0.025 |
| Fuel_Level_Percent | State Variable | Float | — | 0 | 100 | — |
| Ignition cycle time | input | Integer (milliseconds) | 300 | 300 | 420 | — |

The configuration parameter list is specified in a separate database file including the parameter type, data type and value ranges. Calibration parameter has an offset which indicates the tolerance with respect to its normal value.

EXAMPLE 5

Exemplary Annotated Software Requirements

In any of the examples herein, an annotated software requirement may include a labelled procedural statement stored with the definition and scope of the configuration parameters as a parameter definition file. The procedural statement is labelled with a unique identifier and may include at least one operator.

EXAMPLE 6

Exemplary StateFlow Blocks

In any of the examples herein, a stateflow block is created when the annotated software requirements are parsed. The stateflow blocks may be created for the operators of the labelled procedural statement from the parameter definition file. These stateflow blocks are mapped to the definition and scope of the configuration parameters from the parameter definition file of the annotated software requirements.

EXAMPLE 7

Exemplary Stateflow Model

In any of the examples herein, a stateflow model may be a visual model for capturing, analyzing, and implementing software requirements for delivering better results in the business.

EXAMPLE 8

Exemplary General Process

The general process for generating stateflow model from software requirements is processing the software requirements to annotate and, parse them to create a plurality of stateflow blocks and then connecting these stateflow blocks to create a stateflow model.

EXAMPLE 9

Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 3:
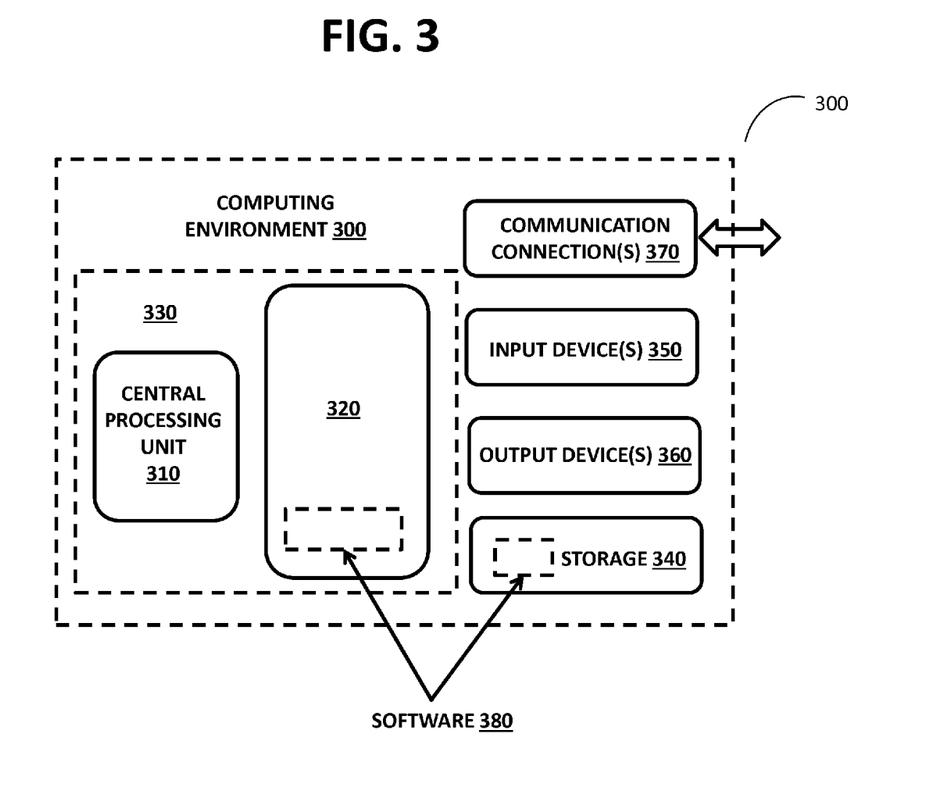
FIG. 3 is a block diagram of an exemplary computing environment suitable for implementing any of the technologies described herein.

FIG. 3 illustrates a generalized example of a suitable computing environment 300 in which the described technologies can be implemented. The computing environment 300 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 3, the computing environment 300 includes at least one processing unit 310 coupled to memory 320. In FIG. 8, this basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. The memory 320 can store software 380 implementing any of the technologies described herein.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other computer-readable media which can be used to store information and which can be accessed within the computing environment 300. The storage 340 can store software 380 containing instructions for any of the technologies described herein.

The input device(s) 350 may be a touch input device such as a keyboard, mouse, pen, or trackball, a voice input device, a scanning device, or another device that provides input to the computing environment 300. For audio, the input device(s) 350 may be a sound card or similar device that accepts audio input in analog or digital form, or a CD-ROM reader that provides audio samples to the computing environment. The output device(s) 360 may be a display, printer, speaker, CD-writer, or another device that provides output from the computing environment 300.

The communication connection(s) 370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method performed by one or more computing devices for generating stateflow models from software requirements comprising:
  receiving, by one or more of the computing devices, at least one software requirement as input, wherein the received at least one software requirement comprises a procedural statement;
  annotating, by one or more of the computing devices, the received at least one software requirement to create at least one annotated software requirement, wherein the annotating comprises:
    labelling the procedural statement of the received at least one software requirement with a unique identifier, wherein the labelled procedural statement comprises multiple operators,
    retrieving configuration parameters for the at least one software requirement from a database, and
    associating the labelled procedural statement with definitions and scopes of the configuration parameters;
  parsing, by one or more of the computing devices, the annotated software requirement to create a plurality of stateflow blocks, wherein the parsing comprises:
    creating a stateflow block for each operator, of the multiple operators of the labelled procedural statement, and
    mapping scopes of the configuration parameters associated with the labelled procedural statement to the created stateflow blocks for the multiple operators, wherein a scope of a configuration parameter is mapped to a stateflow block for an operator that is associated with an identifier for the configuration parameter in the labelled procedural statement; and
connecting, by one or more of the computing devices, the created stateflow blocks to generate a stateflow model for the labelled procedural statement, wherein the connecting comprises:
identifying at least two of the created stateflow blocks that are mapped to the scope of the at least one configuration parameter, and
interconnecting the at least two identified stateflow blocks based on the at least one configuration parameter, to whose scope the at least two identified stateflow blocks are mapped.

2. The method of claim 1 further comprising validating the generated stateflow model by simulation run of test data.

3. The method of claim 1, wherein the received at least one software requirement comprises procedural statements, configuration parameters, or requirement criteria.

4. The method of claim 1, wherein annotating the received at least one software requirement further comprises:
storing the labelled procedural statement with the definitions and scopes of the configuration parameters of the received at least one software requirement in a parameter definition file.

5. The method of claim 4 wherein one or more of the plurality of stateflow blocks are created for operators of the at least one labelled procedural statement from the parameter definition file; and
the mapping comprises mapping the definition and scope of the at least one configuration parameter from the parameter definition file to the created stateflow blocks.

6. The method of claim 1, wherein connecting the created stateflow blocks further comprises:
repeating the identifying and the interconnecting until no further interconnection between the created stateflow blocks is possible.

7. A stateflow management system for generating stateflow models from software requirements comprising:
at least one processor; and
memory storing computer-executable instructions causing the at least one processor to perform operations comprising:
receiving at least one software requirement as input, wherein the at least one software requirement comprises a procedural statement;
annotating the received at least one software requirement, to create at least one annotated software requirement, wherein the annotating comprises:
labelling the procedural statement of the received at least one software requirement with a unique identifier, wherein the labelled procedural statement comprises multiple operators,
retrieving configuration parameters for the at least one software requirement from a database, and
associating the labelled procedural statement with definitions and scopes of the configuration parameters;
parsing the annotated software requirement to create a plurality of stateflow blocks, wherein the parsing comprises:
creating a stateflow block for each operator, of the multiple operators of the labelled procedural statement, and
mapping scopes of the configuration parameters associated with the labelled procedural statement to the created stateflow blocks for the multiple operators, wherein a scope of a configuration parameter is mapped to a stateflow block for an operator that is associated with an identifier for the configuration parameter in the labelled procedural statement; and
connecting the created stateflow blocks to generate a stateflow model for the labelled procedural statement, wherein the connecting comprises:
identifying at least two of the created stateflow blocks that are mapped to the scope of the at least one configuration parameter, and
interconnecting the at least two identified stateflow blocks based on the at least one configuration parameter.

8. The stateflow management system of claim 7 wherein the operations further comprise validating the generated stateflow model by simulation run of test data.

9. The stateflow management system of claim 7, wherein the received at least one software requirement comprises a combination of procedural statements, configuration parameters, and requirement criteria.

10. The stateflow management system of claim 7, wherein annotating the received at least one software requirement further comprises:
storing the labelled procedural statement with the definitions and scopes of the configuration parameters of the received at least one software requirement in a parameter definition file.

11. The stateflow management system of claim 10, wherein one or more of the plurality of stateflow blocks are created for operators of the at least one labelled procedural statement from the parameter definition file; and
the mapping comprises mapping the definition and scope of the at least one configuration parameter from the parameter definition file to the created stateflow blocks.

12. The stateflow management system of claim 7, wherein connecting the created stateflow blocks further comprises:
repeating the identifying and the interconnecting until no further interconnection between the created stateflow blocks is possible.

13. The stateflow management system of claim 7, wherein the operations further comprise:
displaying a visualization of the generated stateflow model.

14. One or more non-volatile computer-readable media storing computer-executable instructions causing one or more processors, when programmed thereby, to perform a method for generating stateflow models from software requirements comprising:
receiving at least one software requirement, as input, wherein the received at least one software requirement comprises a procedural statement;
annotating the received at least one software requirement, to create at least one annotated software requirement, wherein the annotating comprises:
labelling the procedural statement of the received at least one software requirement with a unique identifier, wherein the at least one labelled procedural statement comprises multiple operators,
retrieving configuration parameters for the at least one software requirement from a database, and
associating the labelled procedural statement with definitions and scopes of the configuration parameters;
parsing the annotated software requirement to create a plurality of stateflow blocks, wherein the parsing comprises:

creating a stateflow block for each operator, of the multiple operators of the labelled procedural statement, and mapping scopes of the configuration parameters to the created stateflow blocks for the multiple operators, wherein a scope of a configuration parameter is mapped to a stateflow block for an operator that is associated with an identifier for the configuration parameter in the labelled procedural statement; and connecting the created stateflow blocks to generate a stateflow model for the labelled procedural statement, wherein the connecting comprises:

identifying at least two of the created stateflow blocks that are mapped to the scope of the at least one configuration parameter, interconnecting the at least two identified stateflow blocks based on the at least one configuration parameter, and repeating the identifying and the interconnecting until no further interconnection between the created stateflow blocks is possible.

15. The one or more non-volatile computer-readable media of claim 14, wherein the method further comprises validating the generated stateflow model by simulation run of test data.

16. The one or more non-volatile computer-readable media of claim 14, wherein the received at least one software requirement comprises a combination of procedural statements, configuration parameters, and requirement criteria.

17. The one or more non-volatile computer-readable media of claim 14, wherein annotating the received at least one software requirement further comprises:

storing the labelled procedural statement with the definitions and scopes of the configuration parameters of the received at least one software requirement in a parameter definition file.

18. The one or more non-volatile computer-readable media of claim 17, wherein one or more of the plurality of stateflow blocks are created for operators of the at least one labelled procedural statement from the parameter definition file; and the mapping comprises mapping the definition and scope of the at least one configuration parameter from the parameter definition file to the created stateflow blocks.

* * * * *